United States Patent
Kung et al.

(10) Patent No.: US 8,441,599 B2
(45) Date of Patent: May 14, 2013

(54) PIXEL UNIT AND DISPLAY DEVICE UTILIZING THE SAME

(75) Inventors: Chen-Pang Kung, Jhongli (TW); Cheng-Chung Lee, Hsinchu (TW); Yu-Yang Chang, Zhudong Township (TW); Chung-I Lee, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 443 days.

(21) Appl. No.: 12/885,519

(22) Filed: Sep. 19, 2010

(65) Prior Publication Data

US 2011/0176079 A1    Jul. 21, 2011

(30) Foreign Application Priority Data

Jan. 18, 2010    (TW) ................................ 99101187 A (51) Int. Cl.
*G02F 1/1347* (2006.01)
*H01J 1/62* (2006.01)
*G09G 3/18* (2006.01)

(52) U.S. Cl.
USPC ................................ 349/74; 313/483; 345/38

(58) Field of Classification Search ........................ None
See application file for complete search history.

(56) References Cited

U.S. PATENT DOCUMENTS

| 7,259,737 B2 * | 8/2007 | Ono et al. ........................ 345/82 |
| 7,714,817 B2 * | 5/2010 | Park et al. ........................ 345/82 |
| 2004/0196210 A1 * | 10/2004 | Nagatsuka et al. ............ 345/1.1 |
| 2007/0120780 A1 * | 5/2007 | Park et al. ........................ 345/76 |

* cited by examiner

*Primary Examiner* — Tina Wong
(74) *Attorney, Agent, or Firm* — Wang Law Firm, Inc.; Li K. Wang; Stephen Hsu (57) ABSTRACT

A pixel unit including a first sub-pixel is disclosed. The first sub-pixel includes a first display medium, a second display medium, a first driving device, and a second driving device. The first driving device drives the first display medium. The second driving device drives the second display medium.

58 Claims, 8 Drawing Sheets

PIXEL UNIT AND DISPLAY DEVICE UTILIZING THE SAME

CROSS REFERENCE TO RELATED APPLICATIONS

This Application claims priority of Taiwan Patent Application No. 099101187, filed on Jan. 18, 2010, the entirety of which is incorporated by reference herein.

BACKGROUND OF THE DISCLOSURE

1. Field of the Disclosure

The disclosure relates to a display device.

2. Description of the Related Art

Because cathode ray tubes (CRTs) are inexpensive and provide high definition, they are utilized extensively in televisions and computers. With technological development, new flat-panel displays have continually been developed. When a larger display panel is required, the weight of the flat-panel display does not substantially change when compared to CRT displays.

Generally, flat-panel displays comprise self-luminescence displays and non-self-luminescence displays. Liquid crystal displays (LCD) are non-self-luminescence displays. The self-luminescence displays comprise plasma display panels (PDP), field emission displays (FED), electroluminescent (EL) displays, and organic light emitting diode (OLED) displays.

Presently, a display device only comprises a single display medium. The single display medium is utilized to display dynamic video with high chrominance and display texts with low chrominance. When the single display medium is a display medium with high power consumption, if the single display medium is utilized to display texts with low chrominance, the power consumption of the display device cannot be reduced. When the single display medium is a display medium with low power consumption, if the single display medium is utilized to display dynamic video with high chrominance, high chrominance cannot be achieved.

BRIEF SUMMARY OF THE DISCLOSURE

An exemplary embodiment of a pixel unit comprises a first sub-pixel. The first sub-pixel comprises a first display medium, a second display medium, a first driving device, and a second driving device. The first driving device drives the first display medium. The second driving device drives the second display medium.

An exemplary embodiment of a display device comprises a pixel unit and a driving module. The pixel unit comprises a first sub-pixel. The first sub-pixel comprises a first display medium, a second display medium, a first driving device, and a second driving device. The first driving device drives the first display medium. The second driving device drives the second display medium. The driving module controls the first and the second driving devices.

A detailed description is given in the following embodiments with reference to the accompanying drawings.

BRIEF DESCRIPTION OF THE DRAWINGS

The disclosure can be more fully understood by referring to the following detailed description and examples with references made to the accompanying drawings, wherein.

DETAILED DESCRIPTION OF THE DISCLOSURE

The following description is of the contemplated mode of carrying out the disclosure. This description is made for the purpose of illustrating the general principles of the disclosure and should not be taken in a limiting sense. The scope of the disclosure is determined by reference to the appended claims.

At least two display mediums are integrated into a display device and the display mediums are suitably driven according to image information. For example, when the display device displays an image and the image comprises a low chrominance component and a high chrominance component, a display medium with low consumption is driven to display the low chrominance component such that power consumption of the display device is reduced. A perfect balance between image quality and power consumption is achieved to satisfy image quality requirements and reduce power consumption.

Figure 1A:
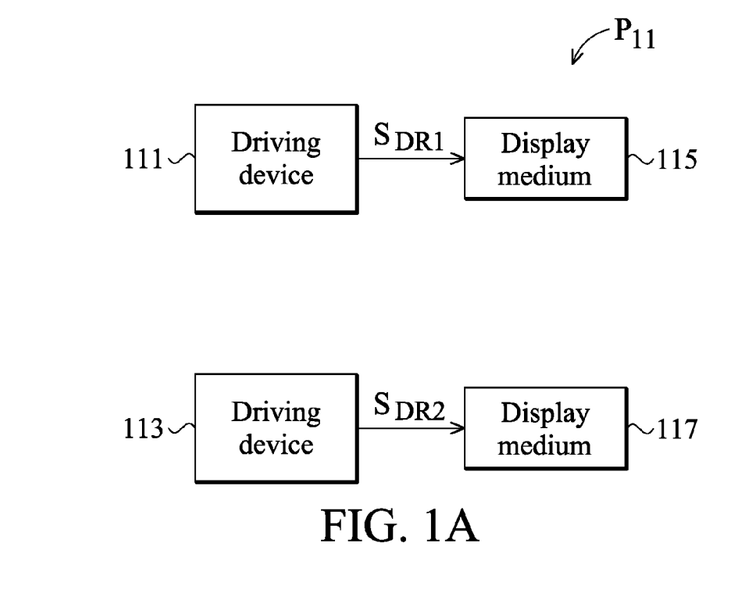
FIG. 1A is a schematic diagram of an exemplary embodiment of a pixel unit.

Generally, a display device comprises numerous pixel units. FIG. 1A is a schematic diagram of an exemplary embodiment of a pixel unit. The pixel unit $P_{11}$ only comprises a sub-pixel, but the disclosure is not limited thereto. In other embodiments, a pixel unit may comprise three sub-pixels to display different colors, such as a red color, a green color, and a blue color. The structures of the three sub-pixels are the same.

As shown in FIG. 1A, the pixel unit $P_{11}$ comprises driving devices 111 and 113 and display mediums 115 and 117. The driving device 111 drives the display medium 115 to display images or video with high chrominance. The driving device 113 drives the display medium 117 to display text or patterns with low chrominance. In this embodiment, when the driving device 111 drives the display medium 115, the driving device 113 does not drive the display medium 117. When the driving device 113 drives the display medium 117, the driving device 111 does not drive the display medium 115.

In one embodiment, the driving device 111 generates a driving signal $S_{DR1}$ to drive the display medium 115. The driving device 113 generates a driving signal $S_{DR2}$ to drive the display medium 117. The disclosure does not limit the types of the driving signals $S_{DR1}$ and $S_{DR2}$.

In one embodiment, the driving signals $S_{DR1}$ and $S_{DR2}$ are current signals or voltage signal. In some embodiments, the driving signal $S_{DR1}$ is a current signal and the driving signal $S_{DR2}$ is a voltage signal.

Generally, an image displayed on a display device typically comprises text or patterns with low chrominance and comprises patterns or video with high chrominance. If a display medium with high power consumption is utilized to display an image, although the quality of the displayed image is high, the power consumption of the display device is high. Thus, when the display device displays text or patterns with low chrominance, a display medium with low power consumption is utilized to display the text or patterns with low chrominance such that the power consumption of the display device is low.

In one embodiment, the display medium 115 is driven by a current signal and the display medium 117 is driven by a voltage signal. The disclosure does not limit the types of the display mediums 115 and 117.

For example, the display medium 115 may be a quick-response liquid powder display (QRLPD) medium, an organic light emitting diode (OLED) medium, or a non-self-luminescence medium (e.g. a non-bistable liquid crystal).

Further, the display medium 117 may be a thermochromic display medium, an electrochromic display medium, an electrophoresis display (ESP) medium, or a bistable liquid crystal (e.g. a cholesteric liquid crystal).

A non-bistable liquid crystal needs continuous voltage or current to maintain its arrangement state (e.g. the arrangement of the liquid crystal). When power is removed, the arrangement of the non-bistable liquid crystal is changed. Compared with a bistable liquid crystal, the arrangement of the bistable liquid crystal can be maintained when the bistable liquid crystal does not continuously receive voltage or current. Thus, power consumption of the bistable liquid crystal is lower than the power consumption of the non-bistable liquid crystal.

In other embodiments, the display mediums 115 and 117 may be the same. The energy of the driving signals $S_{DR1}$ and $S_{DR2}$ is controlled such that the power consumption of the display medium 115 is different from the power consumption of the display medium 117. For example, if the power the driving signal $S_{DR1}$ is greater than the power the driving signal $S_{DR2}$, the power consumption of the display medium 115 is higher than the power consumption of the display medium 117. Thus, the display medium 115 can be utilized to display an image with high chrominance and the display medium 117 can be utilized to display images with low chrominance.

Figure 1B:
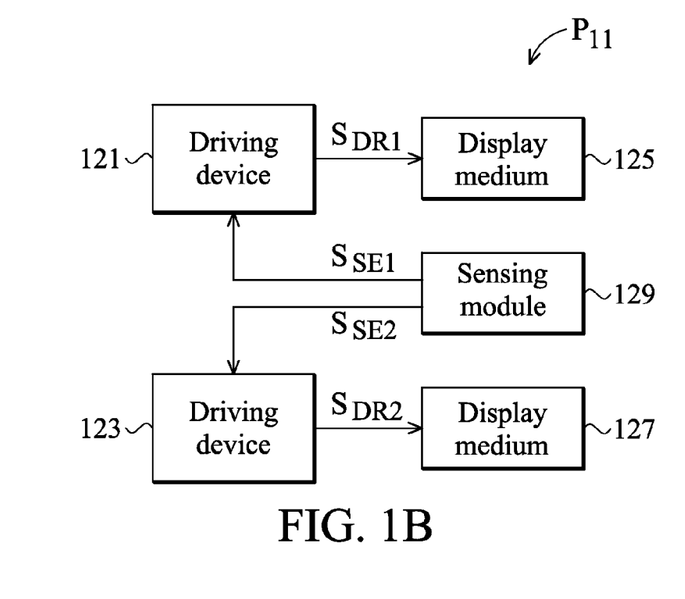
FIG. 1B is a schematic diagram of another exemplary embodiment of a pixel unit.

FIG. 1B is a schematic diagram of another exemplary embodiment of a pixel unit. FIG. 1B is similar to FIG. 1A except for the addition of a sensing module 129. Since the driving devices 121 and 123 and the display mediums 125 and 127 shown in FIG. 1B are the same as the driving devices 111 and 113 and the display mediums 115 and 117 shown in FIG. 1A, descriptions of the driving devices 121 and 123 and the display mediums 125 and 127 are omitted for brevity.

In this embodiment, the sensing module 129 generates sensing signals $S_{SE1}$ and $S_{SE2}$ according to an external light (environment temperature or intensity). The driving device 121 generates the driving signal $S_{DR1}$ according to the sensing signal $S_{SE1}$. The driving device 123 generates the driving signal $S_{DR2}$ according to the sensing signal $S_{SE2}$. Thus, an effect caused by the environment or the external light can be compensated for. In other embodiments, the driving devices 121 and 123 utilize the sensing signals $S_{SE1}$ and $S_{SE2}$ and other signals to generate the driving signals $S_{DR1}$ and $S_{DR2}$. The driving devices 121 and 123 will be described in more detail later.

Figure 2:
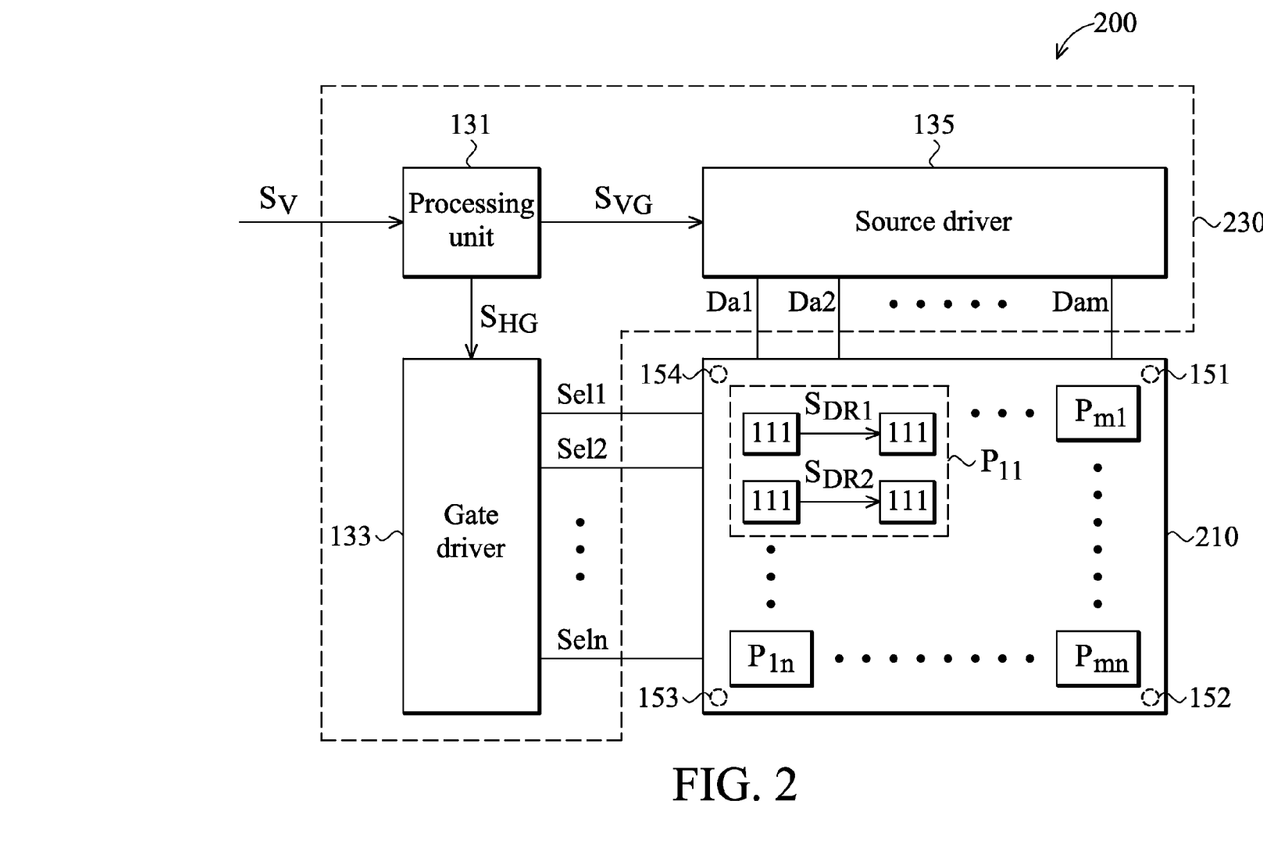
FIG. 2 is a schematic diagram of an exemplary embodiment of a display device.

FIG. 2 is a schematic diagram of an exemplary embodiment of a display device. The display device 200 comprises a display region 210 and a driving module 230. The display region 210 comprises pixel units $P_{11}$-$P_{mn}$. The driving module 230 generates scan signals Sel1-Seln and data signals Da1-Dam. The pixel units $P_{11}$-$P_{mn}$ display an image according to the scan signals Sel1-Seln and the data signals Da1-Dam.

The structure of each of the pixel units $P_{11}$-$P_{mn}$ is shown in FIG. 1A or FIG. 1B. In this embodiment, the driving module 230 controls the pixel units $P_{11}$-$P_{mn}$ according to an image signal $S_V$. In one embodiment, the driving module 230 generates the scan signals Sel1-Seln and the data signals Da1-Dam to control the driving devices of the pixel units $P_{11}$-$P_{mn}$ according to chrominance of the imam signal $S_V$ or the real time of the image signal $S_V$.

As shown in FIG. 2, the driving module 230 comprises a processing unit 131, a gate driver 133, and a source driver 135. The processing unit 131 generates a gate signal group $S_{HG}$ and a source signal group $S_{VG}$ according to the image signal $S_V$. In this embodiment, the processing unit 131 generates the gate signal group $S_{HG}$ and the source signal group $S_{VG}$ to control the driving devices 111 and 113 according to chrominance of the image component of the image signal $S_V$ or real time of the image component of the image signal $S_V$.

For example, when the chrominance of the image component of the image signal $S_V$ or the real time of the image component of the image signal $S_V$ is larger than a preset value, the driving device 111 drives the display medium 115. When the chrominance or the real time of the image component of the image signal $S_V$ is not larger than a preset value, the driving device 113 drives the display medium 117.

The gate driver 133 generates the scan signals Sel1-Seln according to the gate signal group $S_{HG}$. The source driver 135 generates the data signals Da1-Dam according to the source signal group $S_{VG}$. The pixel units $P_{11}$-$P_{mn}$ receive the data signals Da1-Dam according to the scan signals Sel1-Seln and display an image according to the data signals Da1-Dam.

Since the control methods of the pixel units $P_{11}$-$P_{mn}$ are the same, the pixel units $P_{11}$ is given as an example. In one embodiment (e.g. FIG. 3A), the driving devices 111 and 113 of the pixel units $P_{11}$ generate the driving signals $S_{DR1}$ and $S_{DR2}$ according to one scan signal (e.g. sel1) and two data signals (e.g. Da1 and Da2)

Figure 3A:
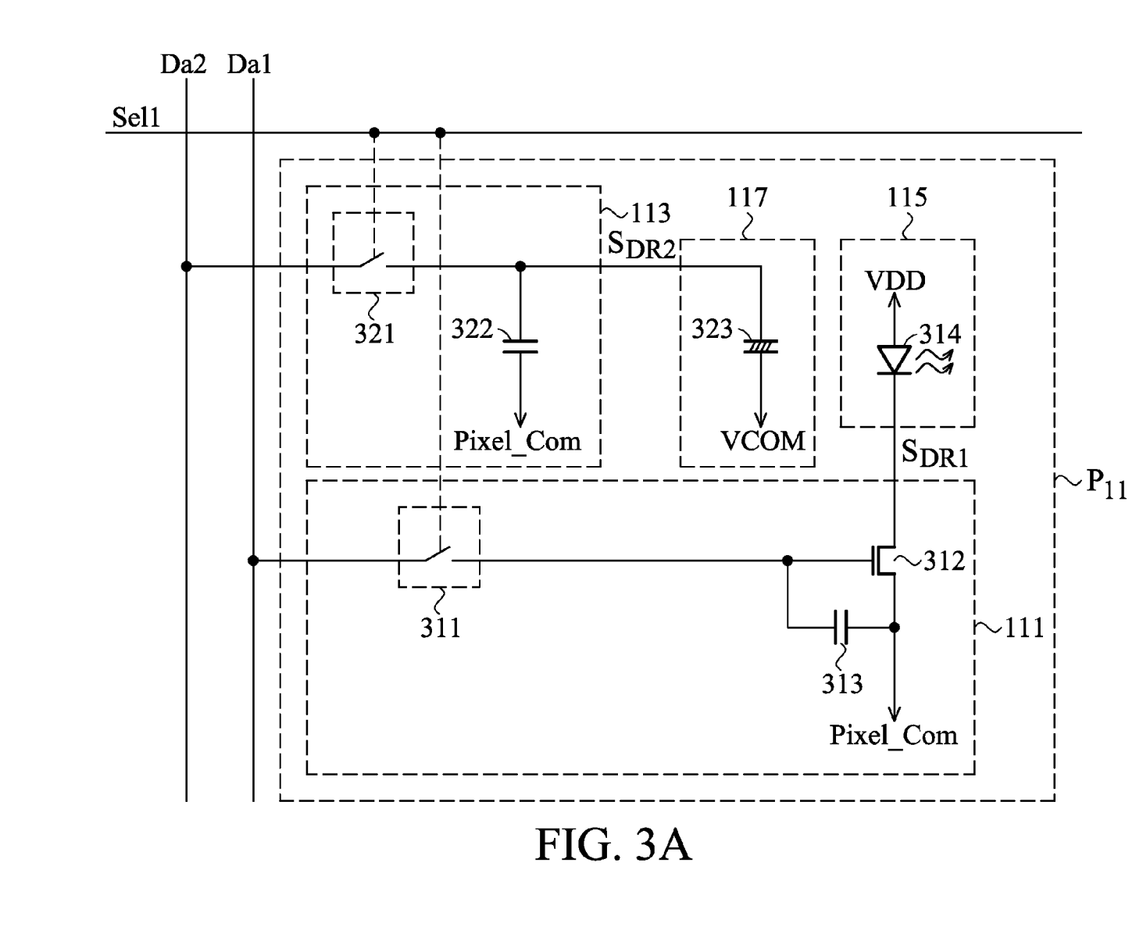
FIGS. 3A-3C are schematic diagrams of other exemplary embodiments of the display device.

Referring to FIG. 3A, the driving device 111 generates the driving signal $S_{DR1}$ according to the scan signal Sel1 and the data signal Da1. In this embodiment, the driving device 111 comprises a switching element 311, a driving element 312 and a storing element 313, but the disclosure is not limited thereto. Those skilled in the art can utilize other circuits to drive the corresponding display medium.

The switching element 311 transmits the data signal Da1 to the storing element 313 according to the scan signal Sel1. Thus, the storing element 313 stores voltage according to the data signal Da1. The driving element 312 generates the driving signal $S_{DR1}$ to the display medium 115 according to the stored voltage of the storing element 313. In this embodiment, the display medium 115 is an OLED 314. The switching element 311 and the driving element 312 are transistors. The storing element 313 can be a capacitor.

As shown in FIG. 3A, the driving device 113 generates the driving signal $S_{DR2}$ according to the scan signal Sel1 and the data signal Da2. In this embodiment, the driving device 113 comprises a switching element 321 and a storing element 322, but the disclosure is not limited thereto. Those skilled in the art can utilize other circuits to drive the corresponding display medium.

The switching element 321 transmits the data signal Da2 according to the scan signal Sel1. The storing element 322 stores voltage to drive the display medium 117 according to the data signal Da2. In one embodiment, the switching element 321 is a transistor. The display medium 117 is an EPD medium 323.

Figure 3B:
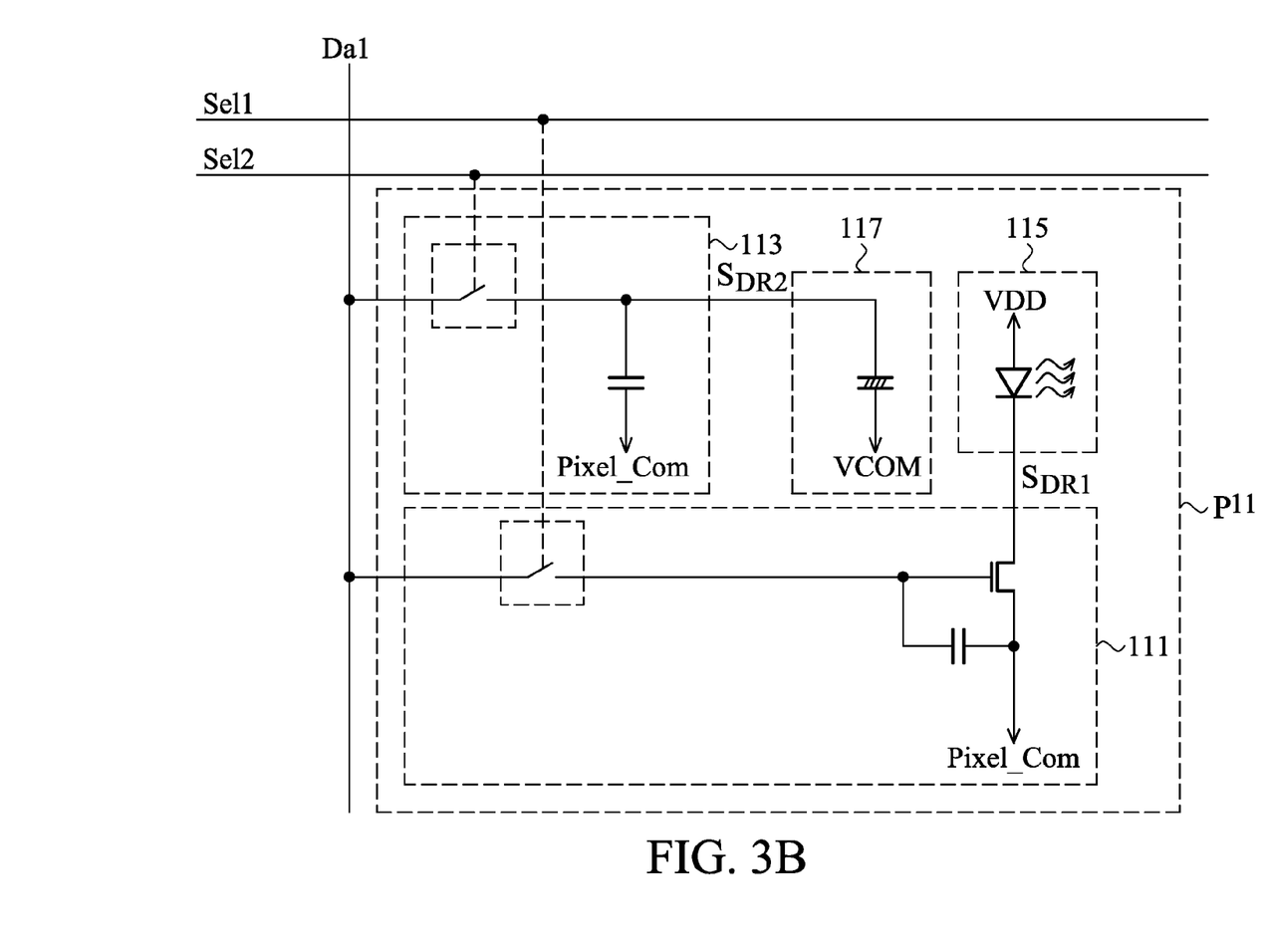

Refer also to FIG. 3B, the driving devices 111 and 113 of the pixel unit $P_{11}$ generate the driving signals $S_{DR1}$ and $S_{DR2}$ according to two scan signals (e.g. Sel1 and Sel2) and one data signal (e.g. Da1). The driving device 111 generates the driving signal $S_{DR1}$ according to the scan signal Sel1 and the data signal Da1. The driving device 113 generates the driving signal $S_{DR2}$ according to the scan signal Sel2 and the data signal Da1.

Figure 3C:
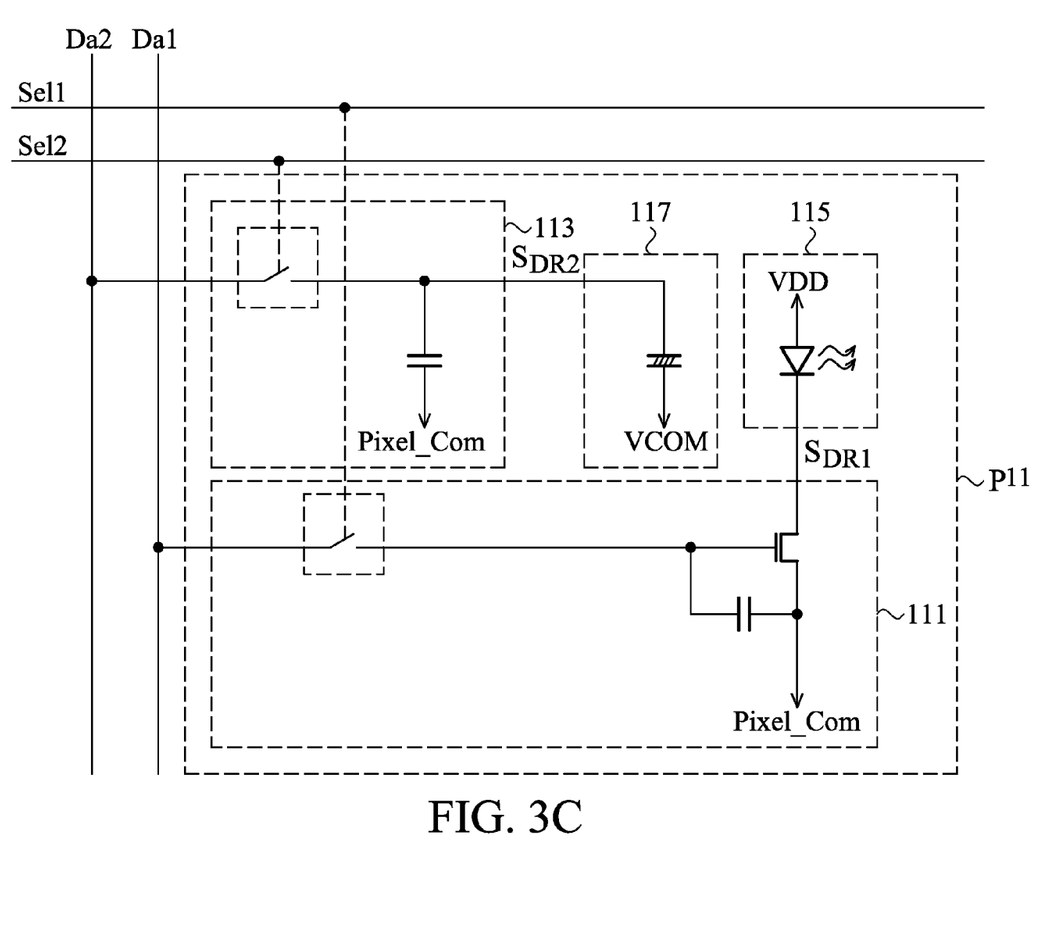

Refer also to FIG. 3C, the driving devices 111 and 113 of the pixel unit $P_{11}$ generate the driving signals $S_{DR1}$ and $S_{DR2}$ according to two scan signals (e.g. Sel1 and Sel2) and two data signal (e.g. Da1 and Da2). The driving device 111 generates the driving signal $S_{DR1}$ according to the scan signal Sel1 and the data signal Da1. The driving device 113 generates the driving signal $S_{DR2}$ according to the scan signal Sel2 and the data signal Da2.

Additionally, in other embodiments, sensing modules 151-154 are disposed in four corners of the display region 210, but the disclosure is not limited thereto. The position and number of the sensing modules 151-154 are not limited.

The sensing modules 151-154 detects the intensity or the temperature of the external light and transmits the detection result to the driving module 230. Thus, the driving module 230 controls the driving devices of the pixel units $P_{11}$-$P_{mn}$ according to the detection result of the sensing modules 151-154.

Figure 4:
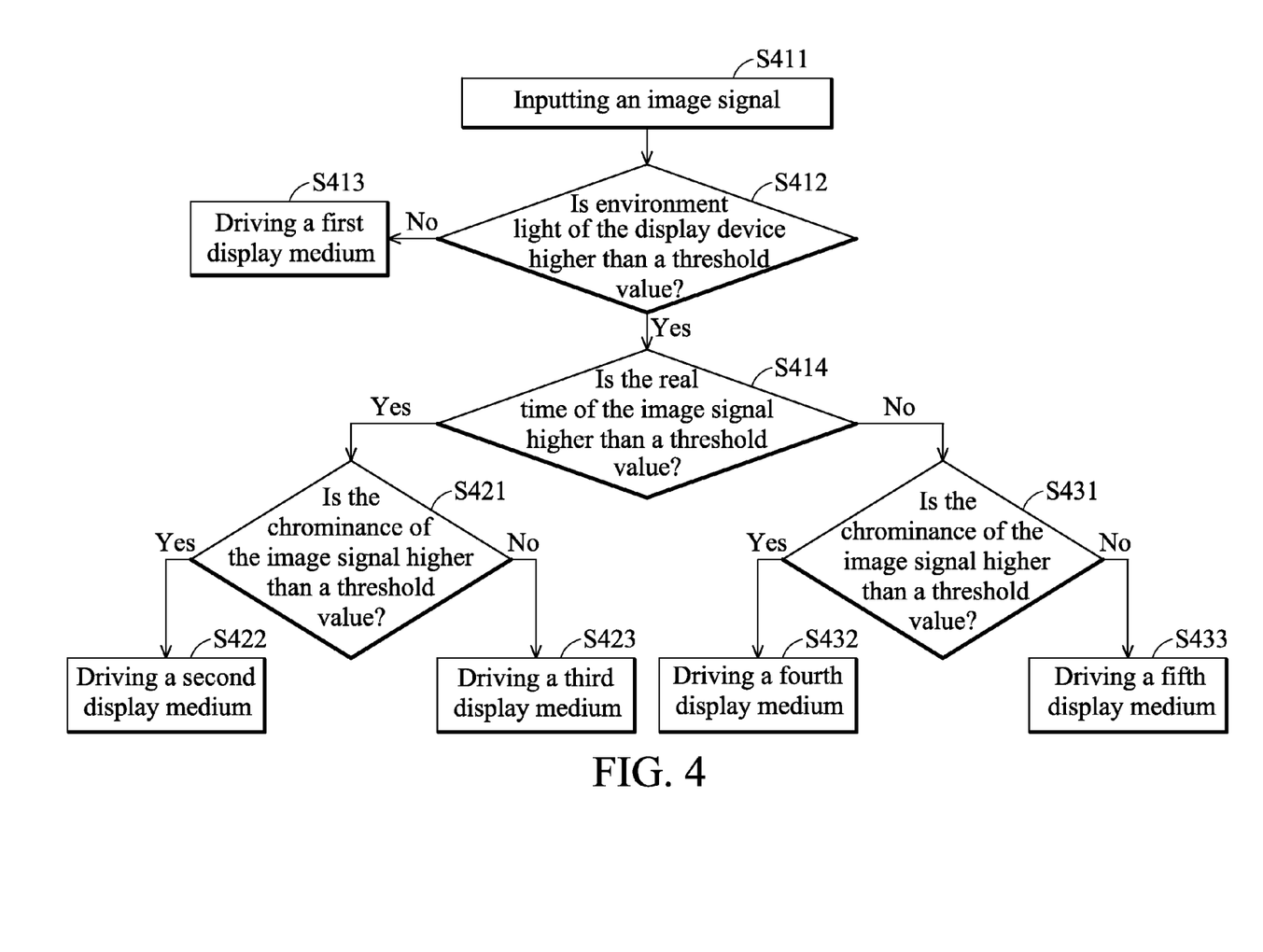
FIG. 4 is a schematic diagram of an exemplary embodiment of a driving method.

FIG. 4 is a schematic diagram of an exemplary embodiment of a driving method. The method shown in FIG. 4 can be applied in a display device comprising at least two display mediums. In this embodiment, the display device comprises five display mediums.

An image signal is input (step S411). It is determined whether environment light of the display device is higher than a threshold value (step S412). If the environment light of the display device is not higher than the threshold value, a first display medium is driven (step S413). In one embodiment, the first display medium is a self-luminescence medium so that a user is assured of being able to view the image displayed by the display device despite being in a dark environment.

If the environment light of the display device is higher than the threshold value, it is determined whether the real time of the image signal is higher than a threshold value (step S414). In this embodiment, the image signal is a dynamic image or a static image after executing step S414. For example, if the real time of the image signal is higher than a threshold value, it indicates that the image signal is a dynamic image. Contrarily, if the real time of the image signal is less than a threshold value, it indicates that the image signal is a static image.

In this embodiment, if the real time of the image signal is higher than a threshold value, it is determined whether the chrominance of the image signal is higher than a threshold value (step S421). It is determined whether that the dynamic image signal is a high chrominance image or a low chrominance image after executing step S421.

If the chrominance of the image signal is higher than a threshold value, a second display medium is driven (step S422). In one embodiment, the second display medium is a high-response high chrominance display medium, such as an OLED or a non-bistable liquid crystal. If the chrominance of the image signal is not higher than a threshold value, a third display medium is driven (step S423). In one embodiment, the third display medium is a high-response low chrominance display medium, such as a QRLPD medium.

If the real time of the image signal is not higher than the threshold value, it is determined whether the chrominance of the image signal is higher than a threshold value (step S431). It is determined that the static image signal is a high chrominance image or a low chrominance image after executing step S431.

If the chrominance of the image signal is higher than a threshold value, a fourth display medium is driven (step S432). In one embodiment, the fourth display medium is a low-response high chrominance display medium, such as a thermochromic display medium or an electrochromic display medium.

If the chrominance of the image signal is not higher than a threshold value, a fifth display medium is driven (step S432). In one embodiment, the fifth display medium is a low-response low chrominance display medium, such as an EPD medium or a bistable liquid crystal.

In this embodiment, the threshold values in steps S412, S414, S421, and S431 are different. The type of the image signal is obtained according to the environment of the display device, the chrominance of the image signal or the real time of the image signal such that the appropriate display medium is driven. Thus, perfect balance between image quality and power consumption is achieved to satisfy image quality requirements and reduce power consumption.

Figure 5:
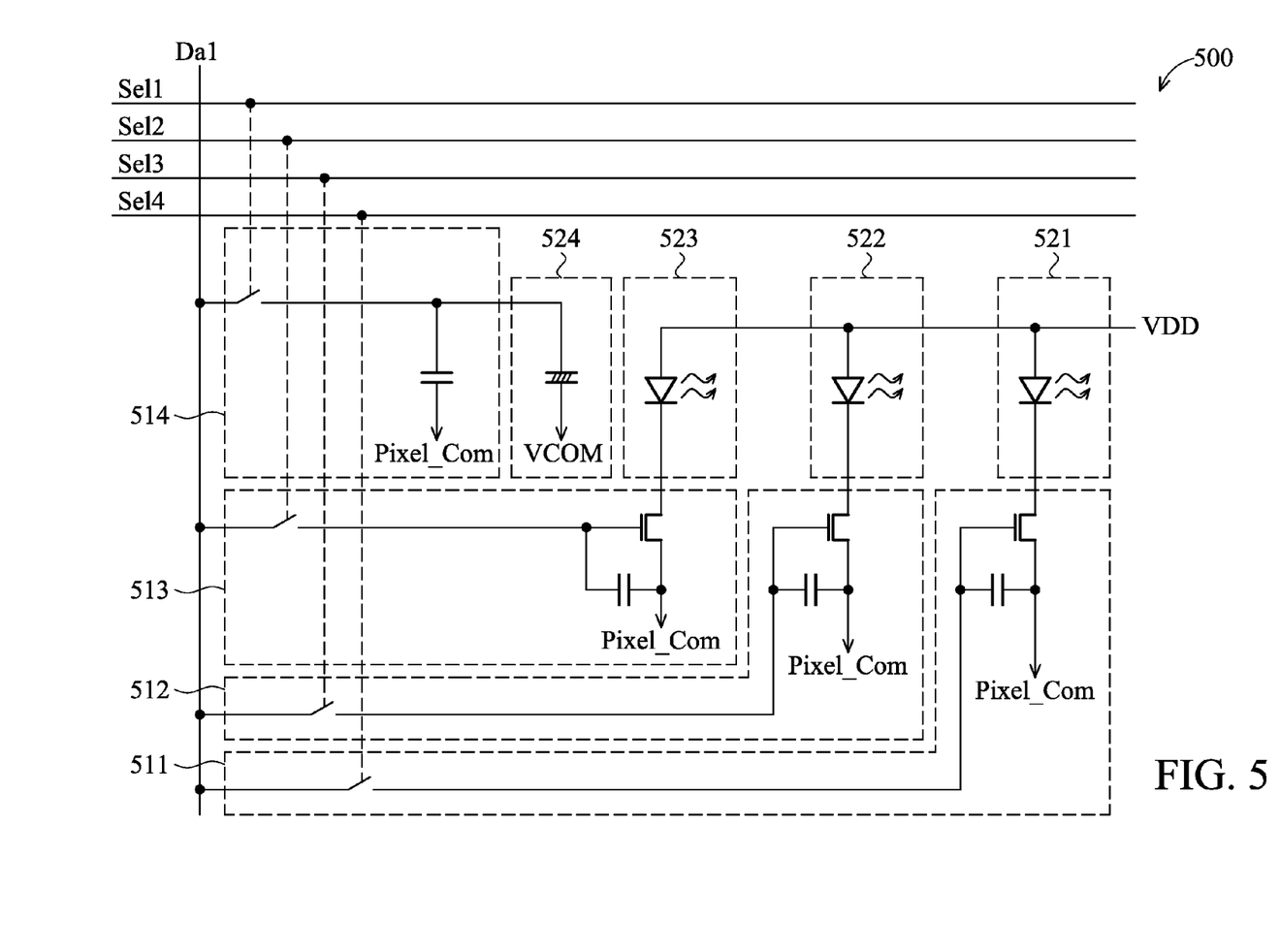
FIG. 5 is a schematic diagram of another exemplary embodiment of a pixel unit.

FIG. 5 is a schematic diagram of another exemplary embodiment of a pixel unit. In this embodiment, the pixel unit 500 displays a three sub-pixel structure. The pixel unit 500 comprises driving devices 511-514 and display mediums 521-524.

The driving devices 511 and 512 and the display mediums 521 and 522 constitute a first sub-pixel. The driving device 513 and the display medium 523 constitute a second sub-pixel. The driving device 514 and the display medium 524 constitute a third sub-pixel. In this embodiment, the first and the third sub-pixels display different colors. For example, the first sub-pixel displays a red color. The second sub-pixel displays a green color. The third sub-pixel displays a blue color.

The driving devices 511-514 drive the display mediums 521-524, respectively. In one embodiment, the types of the display mediums 521-523 are the same but are different from the display medium 524. In other embodiments, the types of the display mediums 521-524 are the same or different. When the types of the display mediums 521-524 are the same, different power levels are provided to the display mediums 521-524 such that the display mediums 521-524 have different power consumption levels.

In this embodiment, the display mediums 521-523 are utilized to display high chrominance components. The display medium 524 is utilized to display low chrominance component. Thus, when the driving device 514 drives the display medium 524, the driving devices 511-513 do not drive the display mediums 521-523. When one of the display mediums 521-523 is driven, the driving device 514 does not drive the display medium 524.

In one embodiment, the display mediums 521-523 are sequentially or simultaneously driven. In anther embodiment, the display mediums 521-523 display different colors. For example, the display medium 521 displays a red color. The display medium 522 displays a green color. The display medium 523 displays a blue color.

Further, the pixel unit 500 operates according to the scan signals Sel1-Sel4 and the data signal Da1 in this embodiment, but the disclosure is not limited thereto. In other embodiments, the pixel unit 500 operates according to a single scan signal (e.g. Sel1) and four data signals (e.g. Da1-Da4).

Figure 6A:
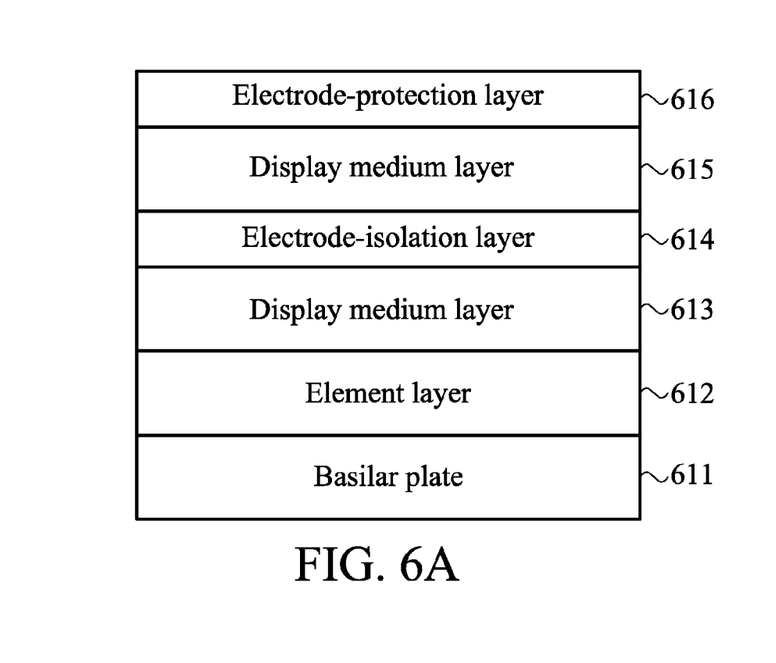
FIG. 6A is a structure diagram of an exemplary embodiment of a pixel unit.

FIG. 6A is a structure diagram of an exemplary embodiment of a pixel unit. An element layer 612 is disposed on a basilar plate 611 to form driving devices. The display medium layer 613 is disposed on the element layer 612 to provide a first display medium. An electrode-isolation layer 614 is disposed on the display medium layer 613. In this embodiment, the electrode-isolation layer 614 comprises at least one pattern electrode or does not comprise a pattern electrode.

A display medium layer 615 is disposed on the electrode-isolation layer 614 to provide a second display medium. An electrode-protection layer 616 is disposed on the display medium layer 615. In this embodiment, the electrode-protection layer 616 comprises at least one pattern electrode or does not comprise a pattern electrode. Additionally, the electrode-protection layer 616 has a waterproof function, an optical function, a hardened film function, a combining function, and a protection function.

The type of the display medium layers 613 and 615 are not limited. In one embodiment, the display medium layer 613 serves as the display medium 117 and the display medium layer 615 serves as the display medium 115. In another embodiment, the display medium layer 613 serves as the display medium 115 and the display medium layer 615 serves as the display medium 117.

In this embodiment, the display medium 115 overlaps with the display medium 117, but the disclosure is not limited thereto. In some embodiments, the display mediums 115 and 117 do not overlap with each other. Furthermore, the materials of the basilar palate 611, the element layer 612, the display medium layers 613 and 615, the electrode-isolation layer 614 and the electrode-protection layer 616 are not limited. In one embodiment, one or a combination of the basilar palate 611, the element layer 612, the display medium layers 613 and 615, the electrode-isolation layer 614 and the electrode-protection layer 616 is transparent.

Figure 6B:
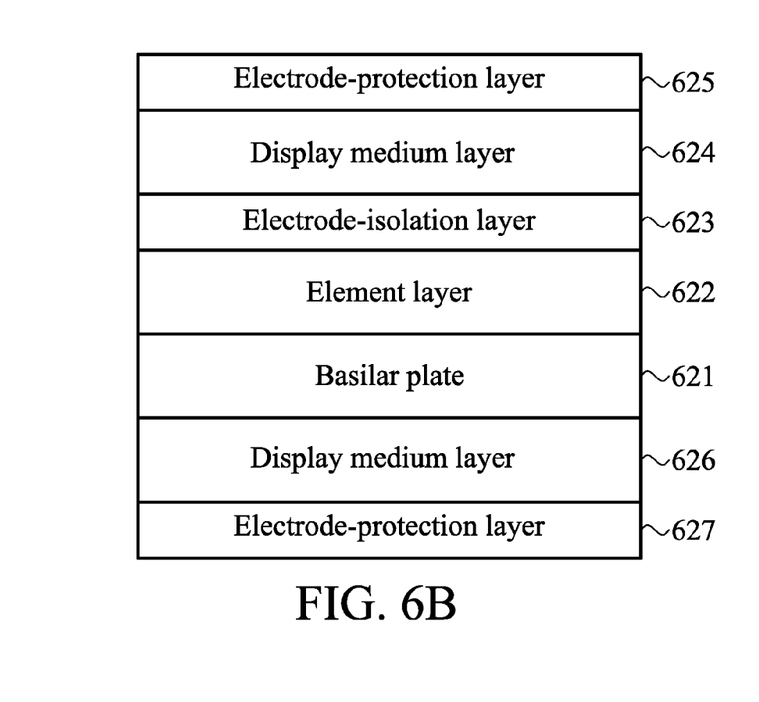
FIG. 6B is a structure diagram of another exemplary embodiment of a pixel unit.

FIG. 6B is a structure diagram of another exemplary embodiment of a pixel unit. The display medium layer 624 is disposed on the basilar palate 621 and the display medium layer 626 is disposed below the basilar palate 621. In this embodiment, the display medium layer 624 provides a display medium driven by a current. Thus, an electrode-isolation layer 623 is disposed below the display medium layer 624 and an electrode-protection layer 625 is disposed on the display medium layer 624.

Additionally, in this embodiment, the display medium layer 626 provides a display medium driven by a voltage. Thus, an electrode-protection layer 627 is disposed below the display medium layer 626. In other embodiments, if the display medium layer 626 provides a display medium driven by a current, an electrode-isolation layer (not shown) is disposed between the basilar plate 621 and the display medium layer 626.

Two display mediums integrated into a display have different power consumption levels when the display mediums receive different powers or the materials of the display mediums are controlled. In one embodiment, if the materials of the display mediums are the same, the powers provided to the display mediums are controlled such that the display mediums have different power consumption levels. In another embodiment, if the materials of the display mediums are different, the display mediums have different power consumption levels. If a display medium with low power consumption displays low chrominance text or patterns, perfect balance between image quality and power consumption is achieved to satisfy image quality requirements and reduce power consumption.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pixel unit, comprising:
    a first sub-pixel comprising:
        a first display medium;
        a second display medium;
        a first driving device driving the first display medium; and
        a second driving device driving the second display medium.

2. The pixel unit as claimed in claim 1, wherein the material of the first display medium is the same as the material of the second display medium.

3. The pixel unit as claimed in claim 1, wherein the material of the first display medium is different from the material of the second display medium.

4. The pixel unit as claimed in claim 1, wherein the first display medium is a self-luminescence medium.

5. The pixel unit as claimed in claim 4, wherein the first display medium is an organic light emitting diode (OLED).

6. The pixel unit as claimed in claim 1, wherein the first display medium is a non-self-luminescence medium.

7. The pixel unit as claimed in claim 6, wherein the first display medium is a non-bistable liquid crystal and the second display medium is a bistable liquid crystal.

8. The pixel unit as claimed in claim 7, wherein the bistable liquid crystal is a cholesteric liquid crystal.

9. The pixel unit as claimed in claim 1, wherein the first display medium is a quick-response liquid power display medium.

10. The pixel unit as claimed in claim 1, wherein the second display medium is a thermochromic display medium, an electrochromic display medium, or an electrophoresis display medium.

11. The pixel unit as claimed in claim 1, wherein the first driving device generates a first driving signal to drive the first display medium and the second driving device generates a second driving signal to drive the second display medium.

12. The pixel unit as claimed in claim 11, wherein the first driving signal is a first voltage signal and the second driving signal is a second voltage signal.

13. The pixel unit as claimed in claim 11, wherein the first driving signal is a first current signal.

14. The pixel unit as claimed in claim 13, wherein the second driving signal is a second current signal.

15. The pixel unit as claimed in claim 13, wherein the second driving signal is a voltage signal.

16. The pixel unit as claimed in claim 1, wherein the first and the second driving devices are disposed on a basilar plate.

17. The pixel unit as claimed in claim 16, wherein the first display medium does not overlap with the second display medium.

18. The pixel unit as claimed in claim 16, wherein the first display medium overlaps with the second display medium.

19. The pixel unit as claimed in claim 18, wherein the first display medium is disposed on the first and the second driving devices and the second display medium is disposed on the first display medium.

20. The pixel unit as claimed in claim 18, wherein the first display medium is disposed on the first and the second driving devices and the second display medium is disposed below the basilar plate.

21. The pixel unit as claimed in claim 1, further comprising:
    a second sub-pixel comprising:
        a third display medium, wherein the material of the third display medium is the same as the material of the second display medium; and a third driving device driving the third display medium; and a third sub-pixel comprising:
  a fourth display medium, wherein the material of the fourth display medium is the same as the material of the second display medium; and
  a fourth driving device driving the fourth display medium, wherein when the first display medium is driven, the third and the fourth display mediums are not driven.

22. The pixel unit as claimed in claim 21, wherein when the second display medium is driven, the third driving device drives the third display medium and simultaneously, the fourth driving device drives the fourth display medium.

23. The pixel unit as claimed in claim 21, wherein:
  when the second display medium is driven, the second display medium displays a first color;
  when the third display medium is driven, the third display medium displays a second color; and
  when the fourth display medium is driven, the fourth display medium displays a third color, and
  wherein the first, the second, and the third colors are different.

24. The pixel unit as claimed in claim 23, wherein the first color is red, the second color is green, and the third color is blue.

25. The pixel unit as claimed in claim 1, wherein when the first driving device drives the first display medium, the second driving device does not drive the second display medium and when the second driving device drives the second display medium, the first driving device does not drive the first display medium.

26. A display device, comprising:
  a pixel unit comprising:
    a first sub-pixel comprising:
      a first display medium;
      a second display medium;
      a first driving device driving the first display medium; and
      a second driving device driving the second display medium; and
  a driving module controlling the first and the second driving devices.

27. The display device as claimed in claim 26, wherein the driving module controls the first and the second driving devices according to an image signal.

28. The display device as claimed in claim 26, wherein the driving module controls the first and the second driving devices according to the chrominance of the image signal.

29. The display device as claimed in claim 26, wherein the driving module controls the first and the second driving devices according to the real time of the image signal.

30. The display device as claimed in claim 26, wherein the driving module comprises:
  a processing unit generating a gate signal group and a source signal group according to the image signal;
  a gate driver receiving the gate signal group to generate a first scan signal and a second scan signal; and
  a source driver receiving the source signal group to generate a first data signal and a second data signal.

31. The display device as claimed in claim 26, wherein the first driving device drives the first display medium according to the first scan signal and the first data signal and the second driving device drives the second display medium according to the first scan signal and the second data signal.

32. The display device as claimed in claim 26, wherein the first driving device drives the first display medium according to the first scan signal and the first data signal and the second driving device drives the second display medium according to the second scan signal and the first data signal.

33. The display device as claimed in claim 26, wherein the first driving device drives the first display medium according to the first scan signal and the first data signal and the second driving device drives the second display medium according to the second scan signal and the second data signal.

34. The display device as claimed in claim 26, further comprising:
  a sensing module generating a sensing signal according to the temperature of an external light, wherein the driving module controls the first and the second driving devices according to the image signal and the sensing signal.

35. The display device as claimed in claim 26, wherein the material of the first display medium is the same as the material of the second display medium.

36. The display device as claimed in claim 26, wherein the material of the first display medium is different from the material of the second display medium.

37. The display device as claimed in claim 26, wherein the first display medium is a self-luminescence medium.

38. The display device as claimed in claim 37, wherein the first display medium is an organic light emitting diode (OLED).

39. The display device as claimed in claim 26, wherein the first display medium is a non-self-luminescence medium.

40. The display device as claimed in claim 39, wherein the first display medium is a non-bistable liquid crystal and the second display medium is a bistable liquid crystal.

41. The display device as claimed in claim 40, wherein the bistable liquid crystal is a cholesteric liquid crystal.

42. The display device as claimed in claim 26, wherein the first display medium is a quick-response liquid power display medium.

43. The display device as claimed in claim 26, wherein the second display medium is a thermochromic display medium, an electrochromic display medium, or an electrophoresis display medium.

44. The display device as claimed in claim 26, wherein the first driving device generates a first driving signal to drive the first display medium and the second driving device generates a second driving signal to drive the second display medium.

45. The display device as claimed in claim 44, wherein the first driving signal is a first voltage signal and the second driving signal is a second voltage signal.

46. The display device as claimed in claim 44, wherein the first driving signal is a first current signal.

47. The display device as claimed in claim 46, wherein the second driving signal is a second current signal.

48. The display device as claimed in claim 46, wherein the second driving signal is a voltage signal.

49. The display device as claimed in claim 26, wherein the first and the second driving devices are disposed on a basilar plate.

50. The display device as claimed in claim 49, wherein the first display medium does not overlap with the second display medium.

51. The display device as claimed in claim 49, wherein the first display medium overlaps with the second display medium.

52. The display device as claimed in claim 51, wherein the first display medium is disposed on the first and the second driving devices and the second display medium is disposed on the first display medium.

53. The display device as claimed in claim 51, wherein the first display medium is disposed on the first and the second driving devices and the second display medium is disposed below the basilar plate.

54. The display device as claimed in claim 26, wherein the pixel unit further comprises:
- a second sub-pixel comprising:
  - a third display medium, wherein the material of the third display medium is the same as the material of the second display medium; and
  - a third driving device driving the third display medium; and
- a third sub-pixel comprising:
  - a fourth display medium, wherein the material of the fourth display medium is the same as the material of the second display medium; and
  - a fourth driving device driving the fourth display medium, wherein when the first display medium is driven, the third and the fourth display mediums are not driven.

55. The display device as claimed in claim 54, wherein when the second display medium is driven, the third driving device drives the third display medium and simultaneously, the fourth driving device drives the fourth display medium.

56. The display device as claimed in claim 54, wherein:
- when the second display medium is driven, the second display medium displays a first color;
- when the third display medium is driven, the third display medium displays a second color; and
- when the fourth display medium is driven, the fourth display medium displays a third color, and
- wherein the first, the second, and the third colors are different.

57. The display device as claimed in claim 56, wherein the first color is red, the second color is green, and the third color is blue.

58. The display device as claimed in claim 26, wherein when the first driving device drives the first display medium, the second driving device does not drive the second display medium and when the second driving device drives the second display medium, the first driving device does not drive the first display medium.

* * * * *